US012592076B2

(12) United States Patent
Mousavi

(10) Patent No.: US 12,592,076 B2
(45) Date of Patent: Mar. 31, 2026

(54) OBJECT IDENTIFICATION SYSTEM AND METHOD

(71) Applicant: Brunel University London, Uxbridge (GB)

(72) Inventor: Alireza Mousavi, London (GB)

(73) Assignee: Brunel University London, Uxbridge (GB)

( * ) Notice: Subject to any disclaimer, the term of this patent is extended or adjusted under 35 U.S.C. 154(b) by 656 days.

(21) Appl. No.: 17/729,277

(22) Filed: Apr. 26, 2022

(65) Prior Publication Data

US 2022/0351517 A1 Nov. 3, 2022

(30) Foreign Application Priority Data

Apr. 26, 2021 (GB) ...................................... 2105941

(51) Int. Cl.
*G06T 7/10* (2017.01)
*G06T 3/02* (2024.01)
(Continued)

(52) U.S. Cl.
CPC ................ *G06V 20/50* (2022.01); *G06T 3/02* (2024.01); *G06T 7/10* (2017.01); *G06V 10/28* (2022.01);
(Continued)

(58) Field of Classification Search
CPC ...... G06V 20/50; G06V 10/7747; G06T 7/10; G06T 3/02; G06T 2207/30112
See application file for complete search history.

(56) References Cited

U.S. PATENT DOCUMENTS 8,644,578 B1 * 2/2014 Wiley ..................... G06T 17/00
382/131
2005/0036689 A1 * 2/2005 Mahdavieh .............. G01V 5/20
382/199
(Continued)

FOREIGN PATENT DOCUMENTS

CN 108182673 A * 6/2018 ............. A01B 77/00
CN 109902578 B * 1/2021
(Continued)

OTHER PUBLICATIONS

Extended European Search Report for EP Application No. 22275052.3 dated Oct. 12, 2022.
(Continued)

*Primary Examiner* — Vincent Rudolph
*Assistant Examiner* — Bradley O Felix
(74) *Attorney, Agent, or Firm* — Thomas I Horstemeyer, LLP

(57) ABSTRACT

A method for generating an object detection dataset and a computer implemented object detection system are disclosed. The method comprises:
receiving a training image dataset comprising a plurality of images that include objects of interest, each image comprising pixel values corresponding to an imaged material generated by a penetrating imager;
generating a thresholded image for each of the plurality of images;
segmenting each thresholded image into images corresponding to objects;
creating a greyscale image per object from the segmented images corresponding to that object by, for each object, calculating an average pixel value for each pixel of the object from corresponding pixels of the object in the segmented images;
(Continued)

forming a greyscale image for the object from the averaged pixels;

storing the greyscale images in a data repository as an object detection dataset.

12 Claims, 4 Drawing Sheets

(51) Int. Cl.
　　*G06V 10/28* 　　　(2022.01)
　　*G06V 10/774* 　　(2022.01)
　　*G06V 20/50* 　　　(2022.01)

(52) U.S. Cl.
　　CPC 　*G06V 10/7747* (2022.01); *G06T 2207/30112* (2013.01)

(56) References Cited

U.S. PATENT DOCUMENTS

| | | | |
|---|---|---|---|
| 2006/0110021 A1* | 5/2006 | Luo ........................... | G06T 7/73 |
| | | | 382/170 |
| 2019/0114510 A1* | 4/2019 | Bremer ................ | G06V 10/764 |
| 2019/0213740 A1* | 7/2019 | St-Aubin ............... | G01N 23/04 |
| 2021/0256296 A1* | 8/2021 | Richards ............. | G06F 18/2433 |

FOREIGN PATENT DOCUMENTS

| | | | |
|---|---|---|---|
| EP | 0677817 A2 | * 10/1995 | |
| WO | WO-2021038218 A1 | * 3/2021 | ......... G06K 9/00281 |

OTHER PUBLICATIONS

Search Report for GB Application No. 2105941.5 dated Feb. 8, 2022.

* cited by examiner

OBJECT IDENTIFICATION SYSTEM AND METHOD

CROSS-REFERENCE TO RELATED APPLICATION

This application claims priority to GB Patent Application No. 2105941.5 filed Apr. 26, 2021, the contents of which are incorporated by reference in its entirety as if set forth herein.

FIELD OF THE INVENTION

The present invention relates to an object identification system and method that are particularly applicable for identifying malicious modifications to objects.

BACKGROUND TO THE INVENTION

The quality, provenance and security of electronic devices poses a major operational challenge throughout the life cycle of electronic devices. This life cycle starts with component manufacture, assembly into devices, quality control, software implementation, usage, disposal, and recycle/re-use.

Most Quality Program and Systems Assurance ("QPSA") operations are labour intensive and require significant image-based screening and evaluation by operators regardless of the origin of the image i.e. penetrating (e.g. X-ray, CT Scan, Terahertz) or surface (optical) inspection process. The clutter and overlapping of components and external material at times obfuscate and make detection difficult, time-consuming, labour intensive and costly. These issues arise, for example, in electronic and mechatronic systems assembly and quality control lines of a typical production system, in various security scanning operations (e.g. airports, mailrooms, public, and high-security venues) or in the in future recycling centres where high-value components and devices need to be automatically detected and evaluated.

In recent years, concern over malicious items smuggled onto planes, into public buildings etc has increased. It is not uncommon for people and their baggage to be scanned prior to entry in an attempt to identify threats such as explosives, blades and the like.

The number of people travelling is ever increasing. Furthermore, there is a general desire to deploy similar technologies in other areas such as public buildings, high profile businesses and also at other transport hubs.

It is understood that humans are inherently poor at sporadic visual search of the type described above. One of the biggest slowdowns in the security lines is caused by an operator manually pausing the belt, re-scanning bags, and otherwise taking their time while scanning for threats. Furthermore, the number of skilled/trained operators is a limiting factor on such systems, whilst continuous repetitive manual visual inspections and observations causes fatigue and desensitisation—leading to mistakes and misinterpretation of the subject.

Typically, a machine, such as an x-ray or CT scanner, scans carry-on objects, like a bag, laptop, equipment, or a tray containing various items. Today's standard scanners across most airports use single-view x-ray technology, through which operators see a top-down view of baggage as it passes through the machine. Recent innovations in imaging hardware include multi-view x-rays, multi-spectral x-rays, and CT technology to provide 3-dimensional, or other multi-dimensional views of baggage. Using any of these technologies, human screening operators seek to find prohibited items including firearms, knives and other sharps, explosives, liquids, and other prohibited items.

The device captures an image of the baggage and its density and average atomic number. Based on atomic number, materials of concern are typically color-coded in the image to highlight potential threats and the colour coded image is then displayed on a screen for an operator to review.

The majority of the scanning evaluation is done by human operators although there do exist operator assisted systems that look for threatening areas (e.g. very high-density regions that could be explosives).

STATEMENT OF INVENTION

According to an aspect of the present invention, there is provided a method for generating an object detection dataset comprising:

receiving a training image dataset comprising a plurality of images that include an object of interest, each image comprising pixel values corresponding to an imaged material generated by a penetrating imager;

generating a thresholded image for each of the plurality of images;

segmenting each thresholded image into images corresponding to objects;

creating a greyscale image per object from the segmented images corresponding to that object by, for each object, calculating an average pixel value for each pixel of the object from corresponding pixels of the object in the segmented images;

forming a greyscale image for the object from the averaged pixels;

storing the greyscale images in a data repository as an object detection dataset.

The steps of generating and thresholding may comprise applying an adaptive threshold segmentation algorithm to each image in the training image dataset.

The adaptive threshold segmentation algorithm may include calculating a value for each pixel in an image in dependence on pixels in a predetermined neighbourhood.

The neighbourhood may comprise a square of a predetermined size centered at the pixel.

Preferably, the training image dataset includes a plurality of images of an object of interest, the method further comprising manipulating each image whereby the orientation and scale of the object is substantially the same across the plurality of images.

The method may further comprise updating the greyscale image by adding further segmented images of the object and recalculating the average.

The method may further comprise labelling each segmented image according to its corresponding object and calculating average pixel values from segmented images with the same label.

According to another aspect of the present invention, there is provided a computer implemented object detection method comprising:

receiving an image of interest;

generating a thresholded image for the image of interest;

segmenting the thresholded image into images corresponding to objects;

for each segmented image, computing a correlation coefficient between the segmented image and each greyscale image in the data repository created the above method;

if the correlation coefficient exceeds a predetermined threshold, identifying the object of the segmented image as matching the object of the respective greyscale image.

The method may further comprise filtering the thresholded images by applying an alternate recognition algorithm for a filtered thresholded image.

The method may further comprise storing one or more of the training image dataset and the segmented images in the data repository.

According to another aspect of the present invention, there is provided an object detection method comprising:

receiving a detection image dataset comprising an image that includes an object of interest;

generating a thresholded image for the image;

segmenting the thresholded image into images corresponding to objects;

for each object, comparing the corresponding image to reference images in a data repository, the reference images comprising thresholded segmented images corresponding to objects from which an average pixel value for each pixel of the object from corresponding pixels of the object in the segmented images is calculated and a greyscale image for the object is formed from the averaged pixels, each greyscale image being a reference image;

determining detection of a match upon the comparison identifying a match within a predetermined tolerance value.

According to another aspect of the present invention, there is provided a computer implemented object detection system comprising:

a data repository configured to store an object detection dataset;

an input interface configured to receive a training image dataset comprising a plurality of images that include objects of interest, each image comprising pixel values corresponding to an imaged material generated by a penetrating imager;

a processor configured to execute computer program code for executing an image processor, including:

computer program code configured to generate a thresholded image for each of the plurality of images in the training image dataset;

computer program code configured to segment each thresholded image into images corresponding to objects;

computer program code configured to create a greyscale image per object from the segmented images corresponding to that object by, for each object, calculating an average pixel value for each pixel of the object from corresponding pixels of the object in the segmented images;

computer program code configured to form a greyscale image for the object from the averaged pixels;

computer program code configured to store the greyscale images in a data repository as an object detection dataset.

The computer implemented object detection system may further comprise: computer program code configured to receive a further image comprising pixel values corresponding to an imaged material generated by a penetrating imager; computer program code configured to generate a thresholded image from the pixels of the further image;

computer program code configured to segment the thresholded image of the further image into one or more classification images, each classification image corresponding to an object;

computer program code configured, for each classification image, to compute a correlation coefficient between the segmented image and each greyscale image in the data repository;

computer program code configured, if the correlation coefficient exceeds a predetermined threshold, to identify the classification object as matching the object of the respective greyscale image.

An object detection method is desirable for fast-moving high variety operational environments and in particular for analysis of X-ray and similar images of electronic devices such as laptops and tablets. A quick analysis is required to ensure that the key components of the device are within the acceptable inspection rules and demonstrate minimum abnormality.

Embodiments seek to provide a new and intuitive method of object detection.

Embodiments of the present invention seek to provide an object identification system and method that is not limited to particular sectors or object types and which can be trained to recognise normal and abnormal objects and in particular normal and abnormal electronic devices based on their components and their component layouts.

Preferred embodiments are directed to automated, computer-implemented object identification systems and methods that automatically classify objects from their materials, size, shape and sub-component layout, materials, size and shape. Preferred embodiments build and/or reference a library of standard objects and seek to highlight objects that are presented that are non-standard. Although the object identification system can take inputs from many different input systems, a preferred embodiment receives inputs from x-ray or CT scanning systems. The object identification system can be operated independently of the x-ray/CT system and can be used alongside existing systems and existing human screening, either to provide guidance to the human operator in terms of additional mark-up/overlay on displayed scan images or else as a background system that is looking at other potential threats than the explosives/blades which are the concerns of the human operator.

In preferred embodiments, images are received from penetrating imagers (such as X-ray or CT scanners). Image pixel intensity corresponds to the density and thickness of the material. This enables embodiments to identify not only the size and shape of objects but also the objects within them (for example, electronic components). Multiple source images are each thresholded and segmented before being combined into a single per-object greyscale image. A variety of images from a single source or from multiple sources are combined into the per-object greyscale image.

Objects detection is based on calculating the correlation coefficient between ATS (Adaptive Threshold Segmentation) binary results and EGI (Entropic Grayscale Image) for each patch of the image. While the dataset could be used to train a neural network or similar, it will be seen that the dataset lends itself to a simple and direct comparison based classification that uses the same approach as preparing the classification dataset but then compares the thresholded segmented images to those from the dataset to determine classification. Furthermore, the dataset can be improved over time by addition of source images to the dataset (by thresholding, segmenting and then updating the averaged greyscale image(s) corresponding to objects they contain).

Entropic grayscale images (EGI) are preferably used which are generated using adaptive threshold segmentation results of target object from learning datasets.

Embodiments are based on adaptive threshold segmentation (ATS) which is an extreme variation of analysis adaptation for local image region in terms of the result: the segmentation produces binary results in contrast to background normalization and local contrast methods where each pixel colour is normalized or enhanced. Adaptive threshold determining is often used for background extraction and background normalization procedures. ATS results can be used for evaluation of pattern properties, which, then, can serve as an input for decision-making algorithm. Also, an adaptive threshold of gaussian blur parameters is used as a pre-processing for SIFT and SURF detectors for normalization of number of features. Embodiments use ATS to produce EGI and to calculate the correlation coefficient.

Comparing the method to some of the most popular image processing methods, it was found that compared to Oriented Gradients+Support Vector Model (HOG+SVM), the proposed system is 40 times faster than the former approach. For example, if it takes HOG+SVM 120 seconds to complete the detection and analysis process, embodiments of the present invention only take 3 seconds in a normal operational personal computer ("PC"). Such a superior performance makes the proposed method much more suitable for real-time operations and practical usage for inspection and differentiation functionalities. The output of the method has been demonstrated to be of use for device identification and abnormality detection in real operational environments.

Embodiments may additionally include parallel off-line deep learning algorithms to adjust and improve the off-line analytics as the image libraries expand in quantity and variety.

Throughout this application, devices such as electronic devices are used as examples of the objects being scanned and identified. However, the approach can also be applied to other objects, with exactly the same technology. It will be appreciated that objects ranging from jewellery and shoes to computer components (hard drives, graphics cards etc), to portable devices and larger complex objects such as bicycles and vehicles could be the subject of scans.

The system may further comprise a user interface configured to receive a designation of an object from a user, the designation corresponding to one of the pre-classified objects in the classification database, the classifier being configured to match the object to the designated pre-classified object and identify and output differences between the segments of the image and the designated pre-classified object.

In addition to matching of unknown objects to pre-classified objects, embodiments preferably also support guided matching. For example, a user may state an object is a certain model of smartphone and the system may confirm whether there is a match to that model's pre-classified object in the database.

The layout is then compared to reference devices and inconsistencies are flagged.

A significant amount of research and development effort has been dedicated to computer vision for X-ray image processing. The applications in industrial systems are wide, such as testing, inspection and evaluation of castings, welds, food, cargos and baggage screening. Some research papers are related to emphasizing dangerous objects and materials using particular image colouring or background removal. In image processing, background removal is usually performed by an adaptive colour conversion. Feature detectors are often used for object detection on X-ray images. For example, in the security industry, the subject of interest is prohibited items like illegal substances, electro-mechanical triggers, guns, knives and razor blades. In manufacturing, the subject of interest is product abnormalities and defects. Detectors like scale-invariant feature transform (SIFT), speeded up robust features (SURF) are used for feature detection and, then, bag of visual words (BOVW) and/or a SVM classifier is used to make a final decision. Attempts have also been made to use 3D SIFT descriptors for object detection on 3D CT images.

Deep Neural Networks (DNN) have been shown to work better with detecting laptops in cases of clutter (e.g. inside bags with the presence of other dense objects). One main attribute contributing to the success of DNN is the presence of a large sample size. However, in many real cases the main issue is the lack of such an extensive database of known devices. Therefore, an alternative method is desired such as that set out in embodiments below.

BRIEF DESCRIPTION OF THE DRAWINGS

Embodiments of the present invention will now be described by way of example only with reference to the accompanying drawings in which.

DETAILED DESCRIPTION

Figure 1:
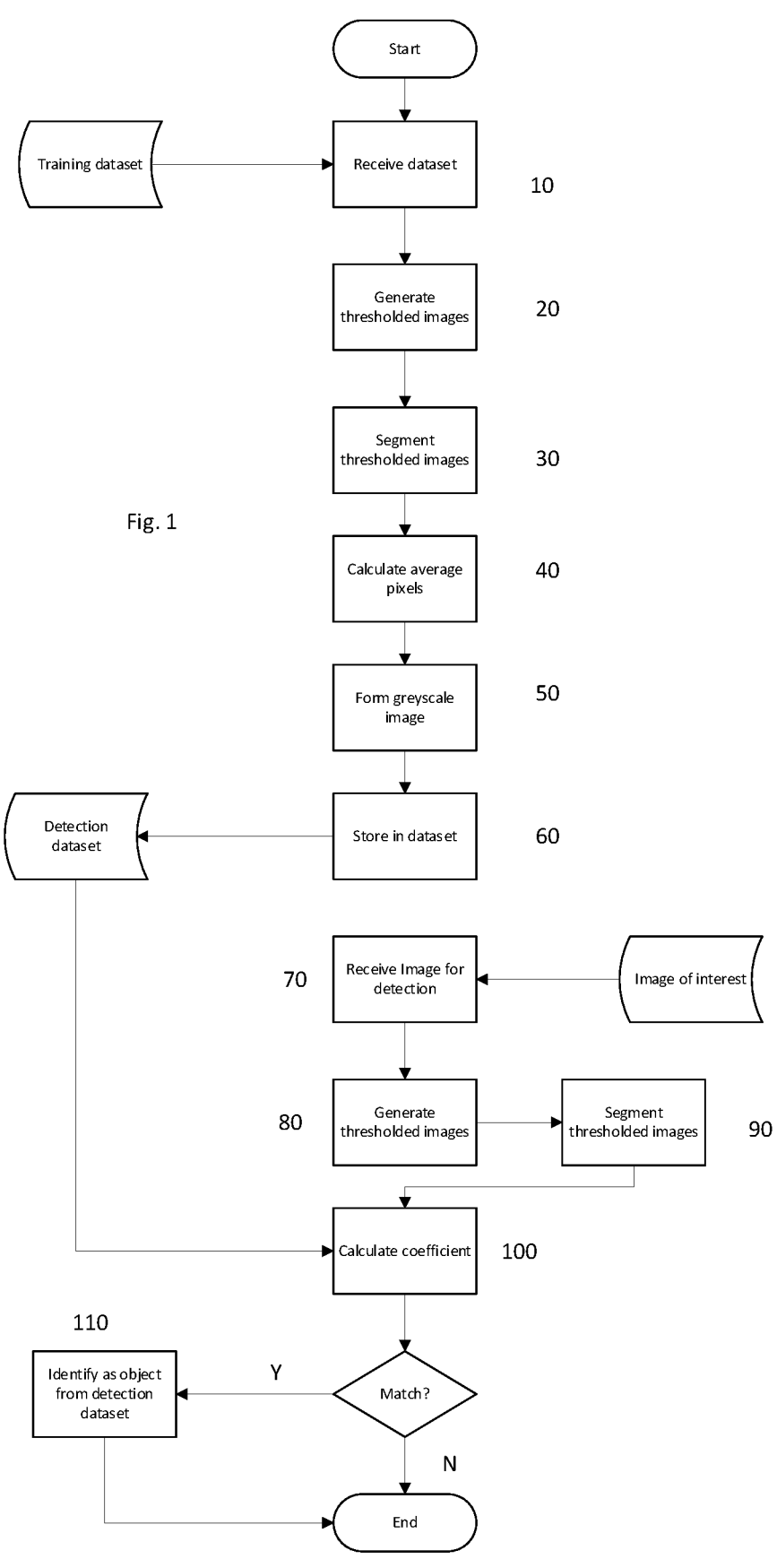
FIG. 1 is a flow diagram of method of generating an object identification dataset according to an embodiment and its subsequent use.

FIG. 1 is a flow diagram of method of generating an object identification dataset according to an embodiment and its subsequent use.

The method includes the steps of receiving a training image dataset comprising a plurality of images that include objects of interest (10), generating a thresholded image for each of the plurality of images (20), segmenting each thresholded image into images corresponding to objects (30), for each object, calculating an average pixel value for each pixel of the object from corresponding pixels of the object in the segmented images (40); forming a greyscale image for the object from the averaged pixels (50), and, storing the greyscale images in a data repository as an object detection dataset (60).

At this point the dataset is created and can be used for object recognition, used as training data for a machine learning system, made available via an API, sold etc.

To use the dataset, an image of interest is received (70) and a thresholded image for the image of interest is generated in step 80. It is then segmented into images corresponding to objects in step 90.

For each segmented image, a correlation coefficient is computed between the segmented image and each greyscale image in the object detection dataset in step 100.

If the correlation coefficient exceeds a predetermined threshold, the object of the segmented image is declared to be a match to the object of the respective greyscale image in step 110.

It will be appreciated that steps 20 and 30 are the same as steps 80 and 90—a common service may be provided that performs the thresholding and segmentation irrespective of whether a training dataset or an image for object detection.

In one embodiment, the method is implemented as a computer implemented system. It may optionally be incorporated into an x-ray scanning system or other security apparatus. The system uses a computer implemented method that can be summarized as follows:

Learning

1) Apply ATS to each object of interest in a learning dataset;

2) Generate EGI for the object of interest using the ATS results;

Detection

3) Apply ATS to each image in a detection dataset;

4) Calculate a correlation coefficient between EGI and each patch the of ATS from step 3;

5) Decide, whether the coefficient value is high enough for object to be present;

6) Optionally apply additional filter if required for better detection accuracy.

It will be appreciated that learning can take place separately and in advance. Optionally, the system could be trained and then distributed to multiple users to use.

The same type of source images is used for the learning process and testing. Several adaptive threshold segmentation results are combined into one entropic grayscale image during the learning stage. Object detection is based on the calculation of correlation coefficient between ATS binary result and EGI for each patch of the image. Subsequently, filters are optionally introduced to improve detection accuracy for some types of objects. Example filters include circle detection, circle texture analysis for CPU and GPU fans; line detection for subcomponents of optical disk drives (ODD).

The imaging method uses input from an X-ray imager, although it will be appreciated that it may be pre-saved images or images from other sources. The imaging method uses a method of segmenting an image to regions and evaluating clusters in each region histogram.

An image of the device to be identified is preferably obtained from a larger x-ray of other source image by cropping and rotating the device subregion from the transformed images as appropriate. An Adaptive Threshold Segmentation (ATS) method is applied to image lightness which corresponds to material density and device thickness. Noticeable components are still visible on the binary image produced by the segmentation. As the ATS result is binary, the problem of background density and partially over-lapped objects and material is overcome. As the ATS is fused and assembled, the image of the reference component called Entropic Grayscale Image (EGI) of the reference component is created. The EGI is then used to calculate the correlation coefficient between each resultant ATS subregion and itself. In order to increase the efficiency of the process and reduce computational effort time, a filter, that reduces the number of comparisons by excluding potentially incorrect coordinates, is preferably implemented.

1. The Application of Adaptive Threshold Segmentation (ATS)

In preferred embodiments, an input image of the algorithm is a colour image of an electronic device (eg. A laptop or tablet) produced by dual-energy X-ray scanner. Preferably, the colour palette is a standard industrial one or at least pixel intensity should correspond to material density and thickness. Preferably, the device is correctly rotated (devices sides are parallel to the X- and Y-axes) and all geometric distortions were mitigated by image preprocessing procedures. Additionally, it is preferred that a scale of the image should be known because the window size is related on the number of pixels that correspond to one centimeter. It will be appreciated that all of these could be dealt with during pre-processing however.

Adaptive threshold segmentation is applied to image lightness (from hue-lightness-saturation colour space). Other grayscale components could be used if object features are visible and distinct for a human. The mean pixel value of a square window around each pixel is preferably used as a threshold. Median value also can be used but it is less effective in terms of performance. It is possible to add or subtract a predetermined constant to the mean or median value for the purpose of adaptive tuning for detection and evaluation of some types of objects. Window size is based on the feature size of the objects. For laptop components (HDD, ODD and fans), it was found that a window with a size of 2.6 cm×2.6 cm worked well but it will be appreciated that this could be varied. The main criteria of ATS parameter assessment are visibility and distinguishability of objects and object feature on a binary result of the segmentation.

In one embodiment, an adaptive threshold segmentation image processing function is used. One example is OpenCV: https://www.tutorialspoint.com/opencv/opencv_adaptiv-e_threshold.htm The equation for Threshold Segmentation is:

$$\text{If } (lx,y >= Tx,y) \text{ Then } Sx,y=1 \text{ Else } Sx,y=0$$

Where x, y are pixel coordinates; lx,y is a pixel value at coordinates of (x, y) on the image (usually, it is intensity or lightness value); Tx,y is a threshold at coordinates of x, y; and Sx,y is segmentation result value at coordinates of (x, y).

In simple segmentation, T is a constant (equal for any x and y). To make a segmentation invariant to the overall lightness of the image (this is an approach used to address the problem of component detection on X-ray images) T, coordinates x, y are calculated separately (this gives the method adaptability). A "mean value of pixel neighbourhood" equation is preferably used to calculate each Tx,y: Tx,y=Sum(Inx,ny)/N. Where nx, ny are pixel coordinates of N pixels of pixel neighbourhood of pixel at x, y. The pixel neighbourhood of pixel at (x, y) is a square with the center at (x, y). The size of the rectangle depends on the scale of the image.

2. Entropic Grayscale Image (EGI) Generation

Accuracy of detection depends on the quality of entropic grayscale image. Although one ATS binary image is enough to detect objects in simple cases, preferably 20-50 ATS images are used to generate an EGI for each component. The more ATS images that are used, the more features of objects can be extracted to appear on the generated EGI. In the EGI, denser or thicker objects appear darker and thinner and less dense objects become lighter. Since each pixel of an EGI has an average value of ATS pixel values at the same coordinate, it is easy to add new ATS images to EGI to improve its quality. The application of EGI results in improved accuracy as number of images are added. This is particularly applicable to objects of interest that have multiple/sophisticated features, such as blades in a fan assembly or a razor blade. In one embodiment, the method may be used selectively. If an object is plain and does not have multiple/sophisticated visible features it would not be necessary to apply such technique, for example, for batteries other algorithms may be used.

Figure 2:
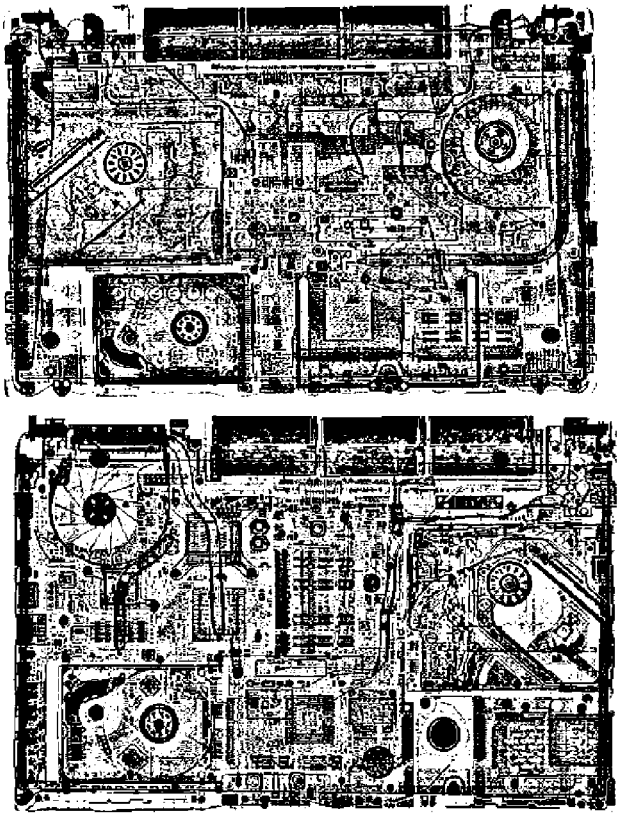
FIG. 2 are thresholded images of objects of interest that may be used as a learning dataset or for object detection.
Figure 3:
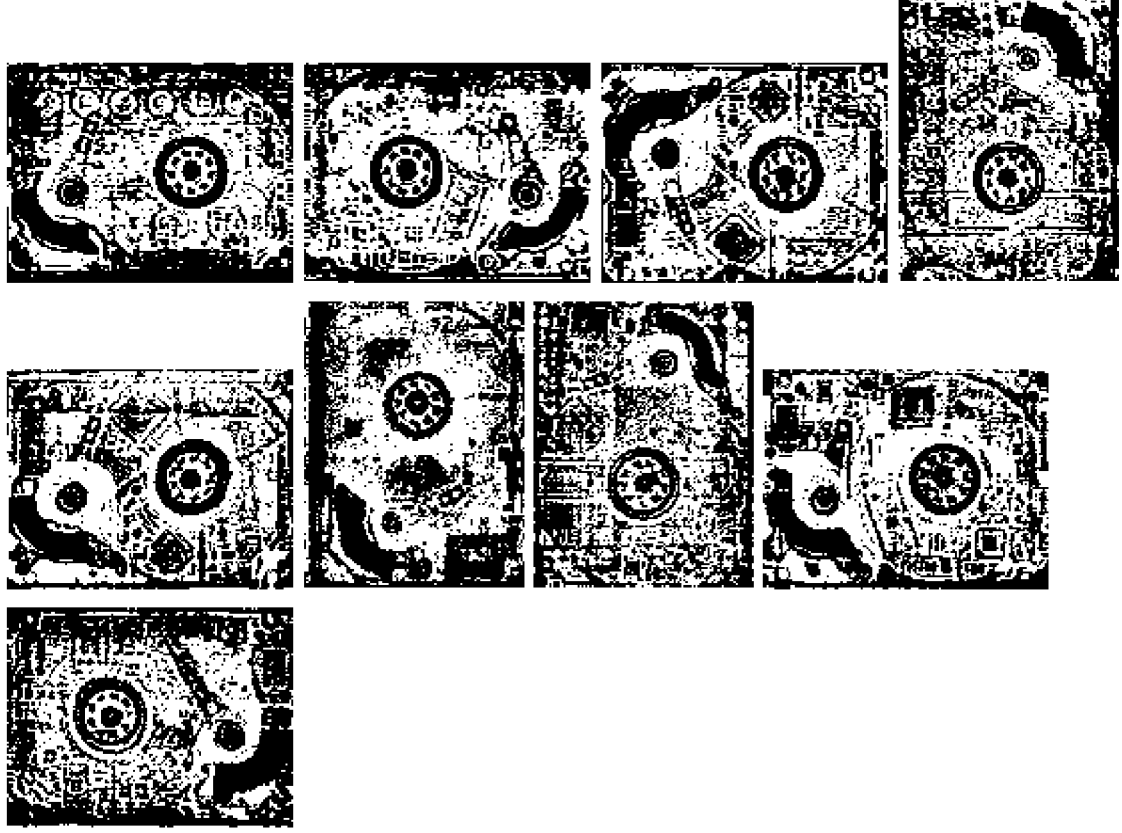
FIG. 3 shows segmented images generated from the images of FIG. 2.
Figure 4:
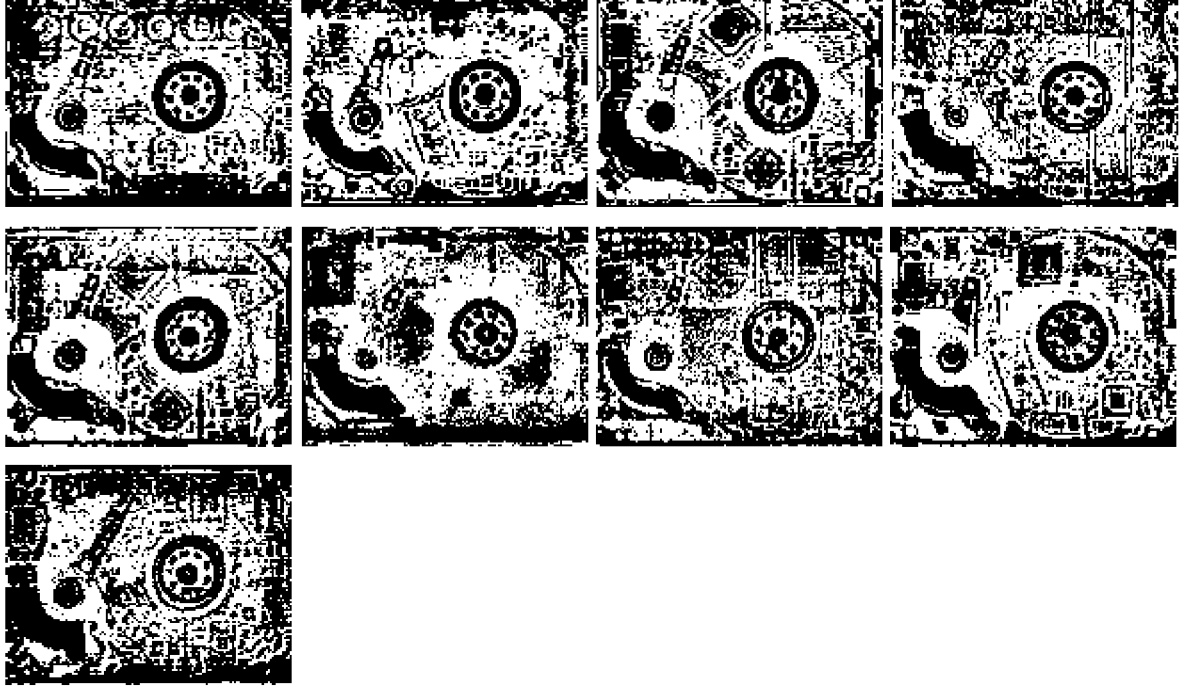
FIG. 4 shows the images of FIG. 3 manipulated so as to align.
Figure 5:
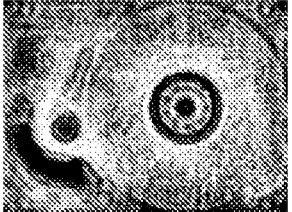
FIG. 5 shows a greyscale image generated from the images of FIG. 4 in accordance with an embodiment.

To produce an EGI:

a. Apply ATS to images with target object (component of electronic device in our case). Examples of ATS of images with laptop with HDD are shown in FIG. 2.

b. Cut a rectangular region which contains target object from each ATS result image (FIG. 3 shows 9 images of the result of step b for 9 Hard Disk Drives)

c. If necessary, rotate and flip target object ATS result images, produced in step b, to align all images in a same way as shown in FIG. 4 (this step is automated by calculation of correlation between each variant of rotation of all ATS result images):

d. Ex,y=Sum(Sn,x,y)/N where Ex,y is EGI pixel value at coordinates of (x, y); Sn,x,y is segmentation result at coordinates of (x, y) on an object ATS result image n produced in step c; N is a number of object ATS result images as shown in FIG. 5.

Objects are labelled in a learning dataset to generate object ATS images for producing EGI. The labelling can be automated. A synthetic EGI image could also be used for automation. To produce a synthetic EGI image for labelling, in one embodiment randomly taken ATS images of a device component are used, areas that do not correspond to object features are filled with grey colour and fixed black and white feature borders applied to make them geometrically correct. Upon producing an ATS result image series for device component, if object width and height are not equal or object features are not symmetrical, image rotation and/or flip are conducted. Since device sides are parallel to X- and Y-axes of the image and component sides are parallel to devices sides (actual for HDD and ODD) or components are symmetrical (actual for fans), rotation angles divisible by 90° are acceptable. During testing and correlation coefficient calculation, the EGI image is also rotated and flipped. Thus, in one embodiment 8 EGI images are used for component detection

3. Object Detection

To check if an object is present, an EGI reference of the object is obtained or produced (from step 2 above), along with correlation coefficient threshold and an image where the object is, probably, present. ATS is first applied to the image. Then, for each subregion of an image a test is performed to detect if it is a target object in the subregion. The size of subregion should be equal to the size of EGI. A correlation coefficient (see equation below) is calculated between EGI and ATS result for the subregion. If this coefficient is higher than correlation coefficient threshold, the object is decided to be present in the subregion. The correlation coefficient equation may be calculated as:

$$C(x, y) =$$

$$\sum_{i=0}^{w-1} \sum_{j=0}^{h-1} \begin{cases} 255 - E(i, j), & A\left(x + i - \frac{w}{2}, y + j - \frac{h}{2}\right) = 0 / w * h * 255 \\ E(i, j), & \text{otherwise} \end{cases}$$

where A is ATS image pixel values, E is EGI image pixel values. These values considered to be in the range [0 . . . 255]. Although condition and integer calculation are used for performance optimization, this could easily be applied to floating point values.

An object is detected if the correlation coefficient value at point (x, y) is higher than a threshold. This threshold can be the lowest coefficient value of objects in the training dataset and can be adjusted during testing process. When a preliminary value of the threshold is lower or equal or slightly larger than 0.5, it means that the object cannot be detected by the produced EGI. The reason for this is either lack of commonly known features or low number of training samples. Note that for any components of interest an EGI or a series of EGI are created, the latter occurs when there is a confidence that features and image alignment is done correctly, but there are little or no common features.

An average "absolute difference" equation:

$$C(x, y) = \sum_{i=0}^{w-1} \sum_{j=0}^{h-1} \frac{255 - \left|A\left(x + i - \frac{w}{2}, y + j - \frac{h}{2}\right) - E(i, j)\right|}{255wh}$$

gives similar result for binary ATS results and could be used for multilevel ATS results which could be calculated using median and quartiles or other percentiles. Also similar result is produced by convolution of normalised ATS images. (An(x; y)=A (x; y)-128) with matrix of Ec where Ec(i; j)=(E(i:j)–128)/128).

An object is detected if the correlation coefficient value at point (x; y) is higher than a threshold. This threshold can be the lowest coefficient value of objects in the training dataset and can be adjusted during testing process. When a preliminary value of the threshold is lower or equal or slightly larger than 0.5, it means that the object cannot be detected by the produced EGI. The reason for this is either lack of commonly known features or low number of training samples.

To reduce computation time, it is possible to ignore some coordinates (x, y) for correlation coefficient evaluation. In this arrangement, using EGI a pixel is selected that is almost always black on ATS (it is centre of the circle for HDD, ODD, fan). Before coefficient evaluation, ATS was applied for device image with a window size of 0.6×0.6 cm. This ATS result is called "cores image". Then, the coefficient is calculated for each image (x, y) for which EGI black pixel is black on "cores image". Where sufficient computational resources are available, such as if executed on a GPU, this step can be removed. It will be appreciated that the 0.6×0.6 cm window is merely an example and other window sizes can be used.

Preferably, object detection uses the above method and separate battery detection and these are integrated into a whole device analysis algorithm where device components and layout of the components are used to identify device type or model.

Experiments were generated EGI for HDD, ODD and fans from learning dataset that contains 48 images of laptops. Due to the variable fan size three different EGIs are produced for fans. The identification accuracy is reliably high for both non-modified and modified devices. For each pair of devices, a layout similarity coefficient based on devices dimensions and component positions and general similarity coefficient based on layout and material similarity are calculated. If the coefficient is larger than a specified threshold, the devices are considered to be similar. The sensitivity is 95% and specificity is 96%. Adding material similarity analysis (general similarity coefficient) results in 100% specificity.

It will be appreciated that the database may take various forms including a central or distributed file store, database (such as SQL or other relational or non-relational database types). It may be implemented using storage devices such as hard disks, random access memories, solid state disks or any other forms of storage media. It will also be appreciated that the processor discussed herein may represent a single processor or a collection of processors acting in a synchronised, semi-synchronised or asynchronous manner.

It is to be appreciated that certain embodiments of the invention as discussed below may be incorporated as code (e.g., a software algorithm or program) residing in firmware and/or on computer useable medium having control logic for enabling execution on a computer system having a computer processor. Such a computer system typically includes memory storage configured to provide output from execution of the code which configures a processor in accordance with the execution. The code can be arranged as firmware or software, and can be organized as a set of modules such as discrete code modules, function calls, procedure calls or objects in an object-oriented programming environment. If implemented using modules, the code can comprise a single module or a plurality of modules that operate in cooperation with one another.

Optional embodiments of the invention can be understood as including the parts, elements and features referred to or indicated herein, individually or collectively, in any or all combinations of two or more of the parts, elements or features, and wherein specific integers are mentioned herein which have known equivalents in the art to which the invention relates, such known equivalents are deemed to be incorporated herein as if individually set forth.

The invention claimed is:

1. A method for generating an object detection dataset comprising:

receiving a training image dataset comprising a plurality of images that include objects of interest, each image comprising pixel values corresponding to an imaged material generated by a penetrating imager;

generating a thresholded image for each of the plurality of images;

segmenting each thresholded image into images corresponding to objects;

creating a greyscale image per object from the segmented images corresponding to that object by, for multiple segmented images of a respective object, calculating an average pixel value for each pixel of the object from corresponding pixels of the object in the respective multiple segmented images;

forming a greyscale image for the object from the averaged pixels;

storing the greyscale images in a data repository as the object detection dataset; and updating the grayscale image by adding further segmented images of the object and recalculating the average.

2. The method of claim 1, wherein the steps of generating and thresholding comprise applying an adaptive threshold segmentation algorithm to each image in the training image dataset.

3. The method of claim 2, wherein the adaptive threshold segmentation algorithm includes calculating a value for each pixel in an image in dependence on pixels in a predetermined neighbourhood.

4. The method of claim 3, wherein the neighbourhood comprises a square of a predetermined size centered at the pixel.

5. The method of claim 1, wherein the training image dataset includes a plurality of images of an object of interest, the method further comprising manipulating each image whereby the orientation and scale of the object is substantially the same across the plurality of images.

6. The method of claim 1, further comprising labelling each segmented image according to its corresponding object and calculating average pixel values from segmented images with the same label.

7. The method of claim 1, further comprising storing one or more of the training image dataset and the segmented images in the data repository.

8. A computer implemented object detection method comprising:

receiving an image of interest, the image comprising a plurality of pixels, each pixel having a pixel value, the pixels corresponding to an imaged material generated by a penetrating imager;

generating a thresholded image from the pixels of the image of interest;

segmenting the thresholded image into images corresponding to objects;

for each segmented image, computing a correlation coefficient between the segmented image and each greyscale image in the data repository of claim 1; and if the correlation coefficient exceeds a predetermined threshold, identifying the object of the segmented image as matching the object of the respective greyscale image.

9. The method of claim 8, further comprising filtering the thresholded images applying an alternate recognition algorithm for a filtered thresholded image.

10. The method of claim 8, further comprising storing one or more of the training image dataset and the segmented images in the data repository.

11. A computer implemented object detection system comprising:

a data repository configured to store an object detection dataset;

an input interface configured to receive a training image dataset comprising a plurality of images that include objects of interest, each image comprising pixel values corresponding to an imaged material generated by a penetrating imager;

a processor configured to execute computer program code for executing an image processor, including:

computer program code configured to generate a thresholded image for each of the plurality of images in the training image dataset;

computer program code configured to segment each thresholded image into images corresponding to objects;

computer program code configured to create a greyscale image per object from the segmented images corresponding to that object by, for multiple segmented images of a respective object, calculating an average pixel value for each pixel of the object from corresponding pixels of the object in the respective multiple segmented images;

computer program code configured to form a greyscale image for the object from the averaged pixels;

computer program code configured to store the greyscale images in a data repository as an object detection dataset; and computer program code configured to update the grayscale image by adding further segmented images of the object and recalculating the average.

12. The computer implemented object detection system of claim 11, further comprising:

computer program code configured to receive an input image comprising pixel values corresponding to an imaged material generated by a penetrating imager;

computer program code configured to generate a thresholded input image from the pixels of the input image;

computer program code configured to segment the thresholded input image into one or more classification images, each classification image corresponding to an object;

computer program code configured, for each classification image, to compute a correlation coefficient between the classification image and each greyscale image in the data repository; and computer program code configured, if the correlation coefficient exceeds a predetermined threshold, to identify the classification object as matching the object of the respective greyscale image.

\* \* \* \* \*